United States Patent
Chen

(10) Patent No.: US 6,688,615 B2
(45) Date of Patent: Feb. 10, 2004

(54) TOOL BOX HAVING DRAWERS

(76) Inventor: Shwu Ruu Chen, No.1, Alley 16, Lane 40, Jinn Te Rd., Taichung (TW)

( * ) Notice: Subject to any disclaimer, the term of this patent is extended or adjusted under 35 U.S.C. 154(b) by 78 days.

(21) Appl. No.: 10/077,705

(22) Filed: Feb. 15, 2002

(65) Prior Publication Data

US 2003/0155729 A1 Aug. 21, 2003

(51) Int. Cl.$^7$ .................................. B62B 11/00
(52) U.S. Cl. .................... 280/47.35; 280/79.2
(58) Field of Search ............... 280/47.131, 47.19, 280/47.26, 47.34, 47.35, 47.24, 79.3, 79.2, 651; 312/257.1, 263, 249.8, 299.11, 108, 111; 211/70.6, 128.1, 126.6; 297/188.11

(56) References Cited

U.S. PATENT DOCUMENTS

| | | | | |
|---|---|---|---|---|
| 3,901,564 A | * | 8/1975 | Armstrong | 384/18 |
| 4,288,137 A | * | 9/1981 | MacDonald | 312/334.45 |
| 4,531,645 A | * | 7/1985 | Tisbo et al. | 211/131.1 |
| 5,207,723 A | * | 5/1993 | Newby, Sr. | 312/249.11 |
| 5,213,351 A | * | 5/1993 | Chen | 280/47.19 |
| 5,294,196 A | * | 3/1994 | Chen | 312/263 |
| 5,318,315 A | * | 6/1994 | White et al. | 280/47.26 |
| 5,599,037 A | * | 2/1997 | Spickler | 280/652 |
| 5,673,984 A | * | 10/1997 | Insalaco et al. | 312/264 |
| 5,799,958 A | * | 9/1998 | Bishop | 280/47.26 |
| 5,887,878 A | * | 3/1999 | Tisbo et al. | 280/47.19 |
| 5,902,025 A | * | 5/1999 | Yu | 312/109 |
| 5,906,381 A | * | 5/1999 | Hovatter | 280/47.18 |
| 5,975,660 A | * | 11/1999 | Tisbo et al. | 312/263 |
| 6,145,931 A | * | 11/2000 | Subotic | 297/423.2 |
| 6,279,822 B1 | * | 8/2001 | Bertram | 232/2 |
| 6,474,759 B2 | * | 11/2002 | Hsu | 312/263 |
| 6,488,346 B2 | * | 12/2002 | Chen | 312/263 |

* cited by examiner

Primary Examiner—Brian L. Johnson
Assistant Examiner—Bridget Avery

(57) ABSTRACT

A tool box includes a base and a top board with two sidwalls and a back board connected between the top board and the base. A plurality of drawers are slidably supported on rails extending from two respective insides of the tow sidewalls. A pad is connected to a top of the top board so that the tool box is used as a bench. Two sets of wheels are connected to a bottom of the base and a cup holder is connected to the back board.

4 Claims, 6 Drawing Sheets

TOOL BOX HAVING DRAWERS

FIELD OF THE INVENTION

The present invention relates to a tool box including drawers and a pad is on a top of the box so that the user may sit on the tool box.

BACKGROUND OF THE INVENTION

A conventional tool box that has drawers is made to be a cube and the drawers are installed in the front surface of the tool box. Generally, the drawers are loaded with parts and tools which are heavy so that the drawers usually cannot be pulled out smoothly. The user often sits on the top of the tool box and the body load deform the rails of the tool box and makes the difficulties of pulling the drawers even worse.

SUMMARY OF THE INVENTION

In accordance with one aspect of the present invention, there is provided a tool box comprising a base having three flanges on a top surface thereof so as to respectively connect to two sidewalls and a back board. A top board is fixedly connected on the two sidewalls and the back board. A pad is connected on a top of the top board and a plurality of drawers are slidably supported on the rails.

The primary object of the present invention is to provide a tool box that can be used as a bench and has rails on insides of the sidewalls so that the drawers are smoothly slidable on the rails.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
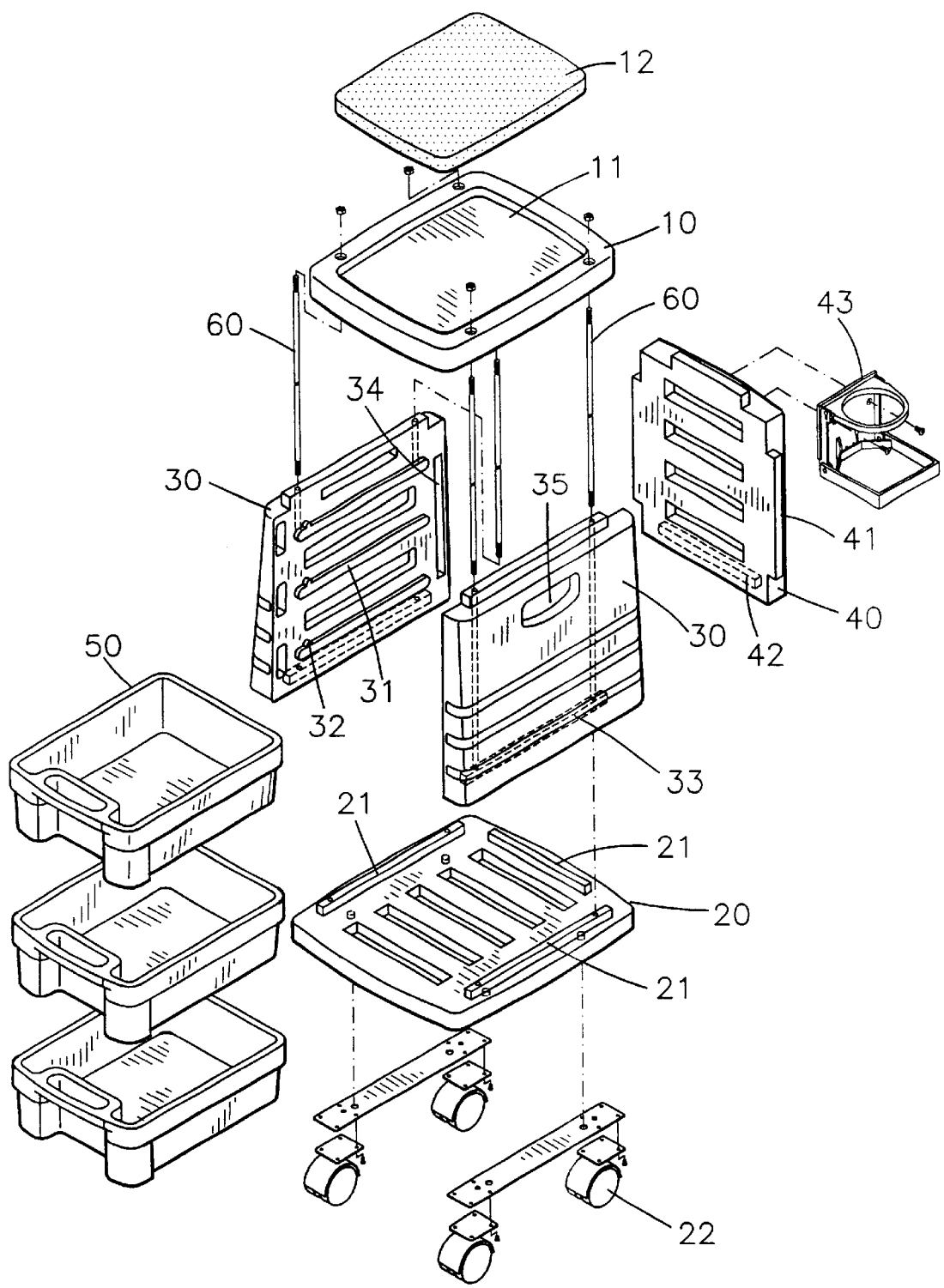
FIG. 1 is an exploded view to show the tool box of the present invention.

Referring to FIGS. 1, 3, 4 and 5, the tool box of the present invention comprises a base 20 having three flanges 21 located on a top surface thereof and arranged as a U-shaped configuration. Two sets of wheels 22 are connected to a bottom of the base 20.

Two sidewalls 30 each have a first groove 33 defined in a bottom thereof and a second groove 34 is defined in an inside of each of the two sidewalls 30. A plurality of rails 31 extend from the inside of each of the two sidewalls 30 and each rail 31 having a boss 32. Each of the sidwalls 30 has a recess 35 defined in an outside thereof.

A back board 40 has a third groove 42 defined in a bottom thereof and two flanges 41 extend from two sides of the back board 40. The three flanges 21 of the base 20 are respectively engaged with the two first grooves 33 of the sidewalls 30 and the third groove 42 of the back board 40. The two flanges 41 of the back board 40 are respectively engaged with the two second grooves 34 in the two sidewalls 30.

A top board 10 is fixedly connected on the two sidewalls 30 and the back board 40 by extending four screws 60 through the top board 10, the two sidewalls 30 and engaged with the base 20. A recessed area 11 is defined in the top board 10 so that a pad 12 is received in the recessed area 11 of the top board 10.

A plurality of drawers 50 are slidably supported on the rails 31 on the two sidewalls 30. The boss 32 prevents the drawer 50 from being dropping off from the rails 31.

Figure 2:
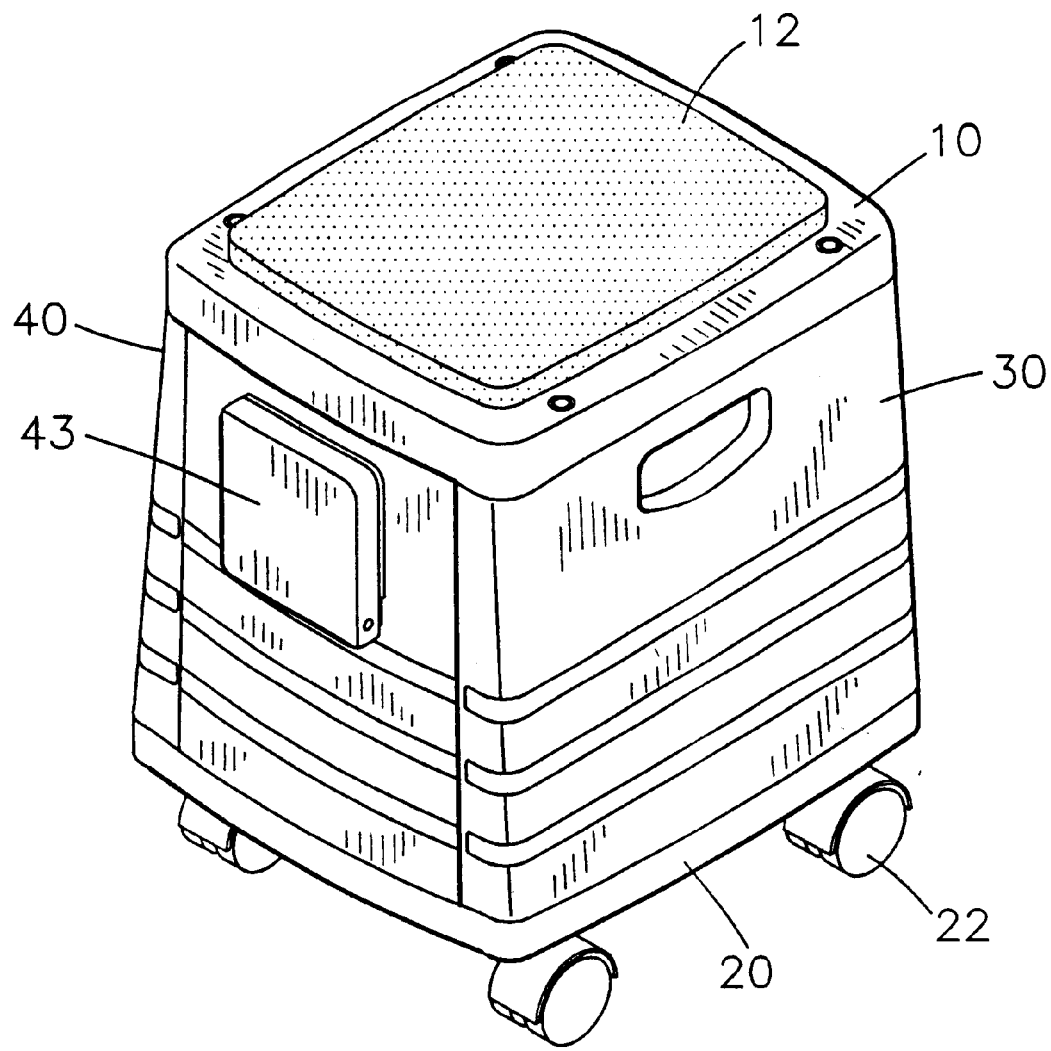
FIG. 2 is a perspective view to show the tool box of the present invention seen from its rear side.
Figure 3:
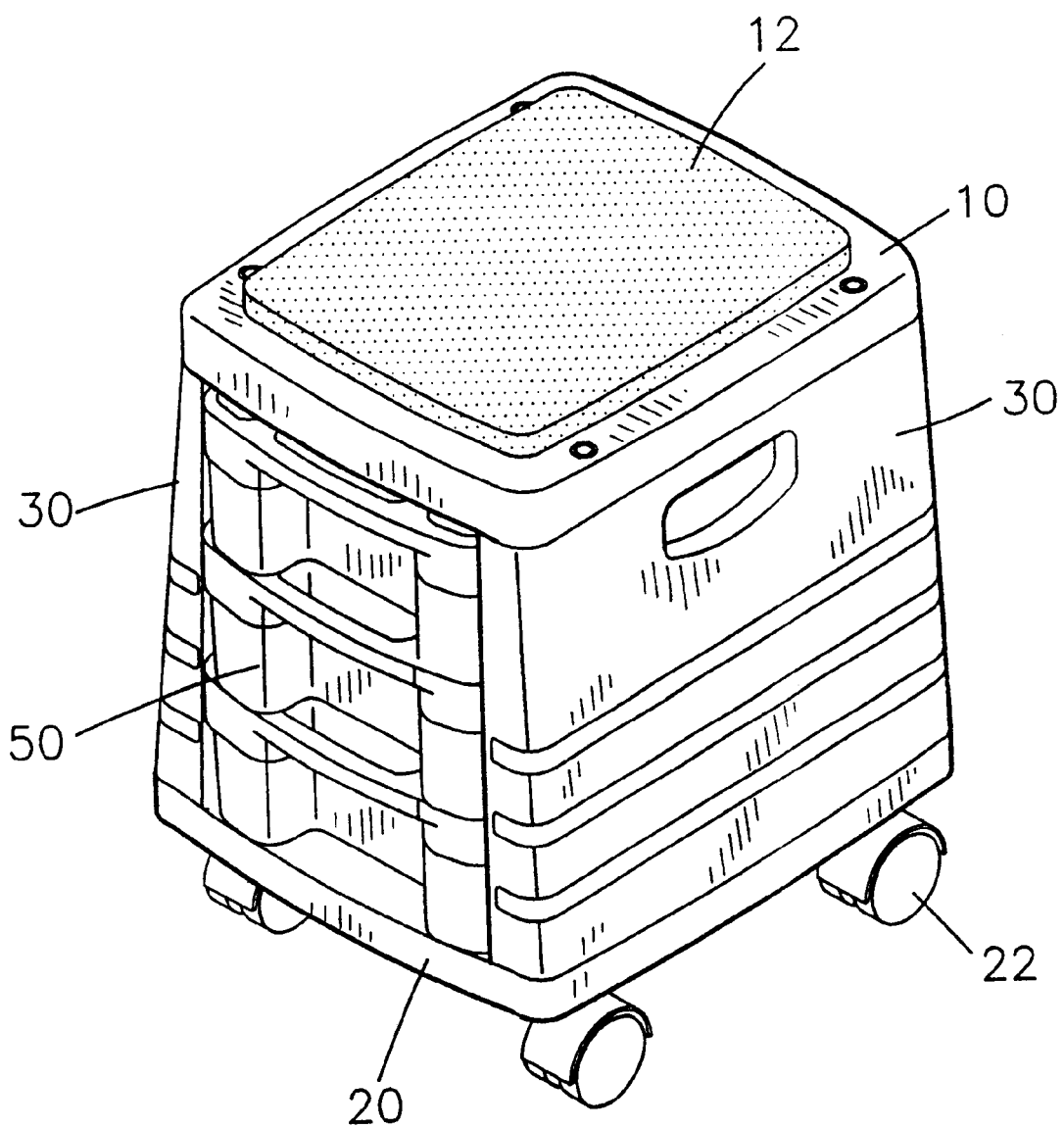
FIG. 3 is a perspective view to show the tool box of the present invention seen from its front side.
Figure 4:
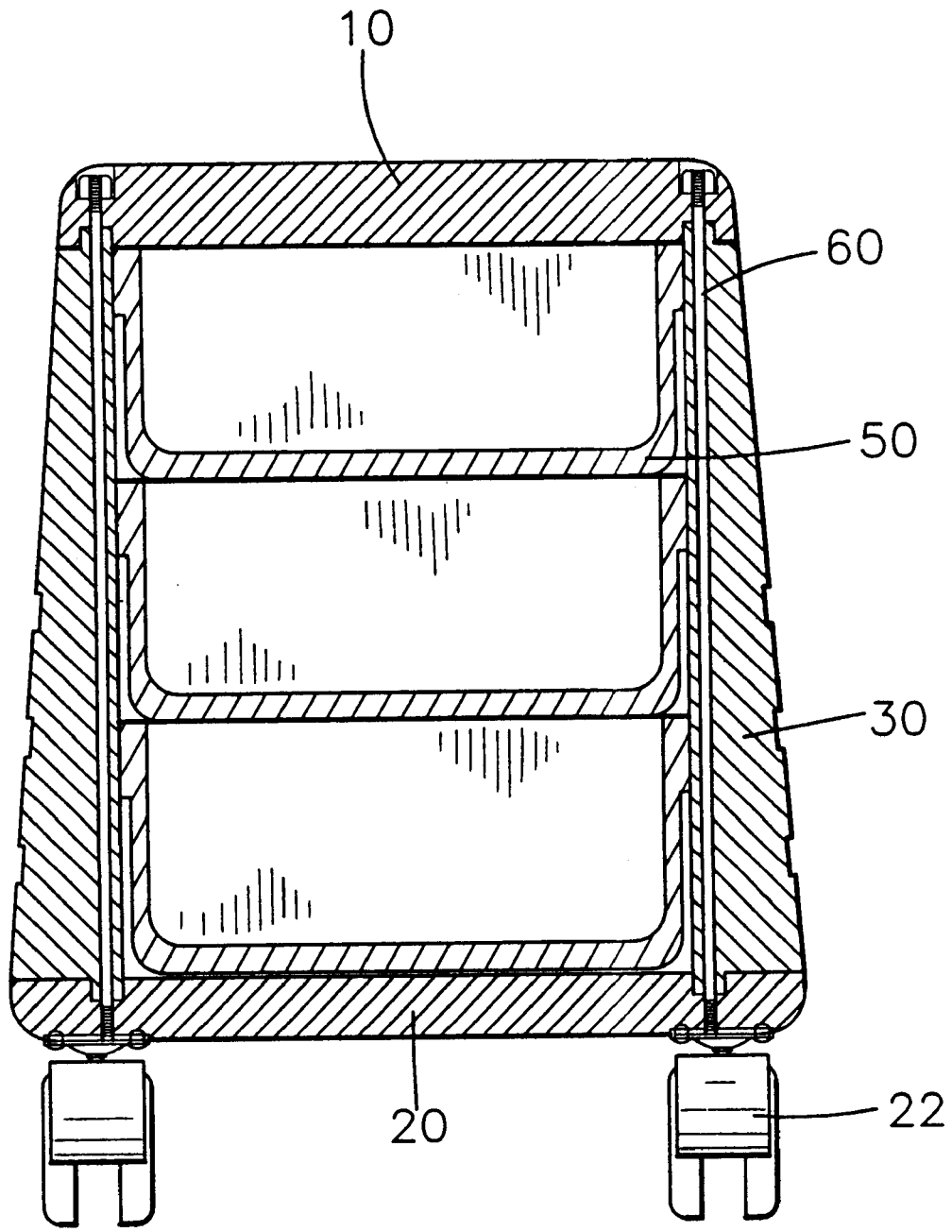
FIG. 4 is a cross sectional view to show the tool box of the present invention.
Figure 5:
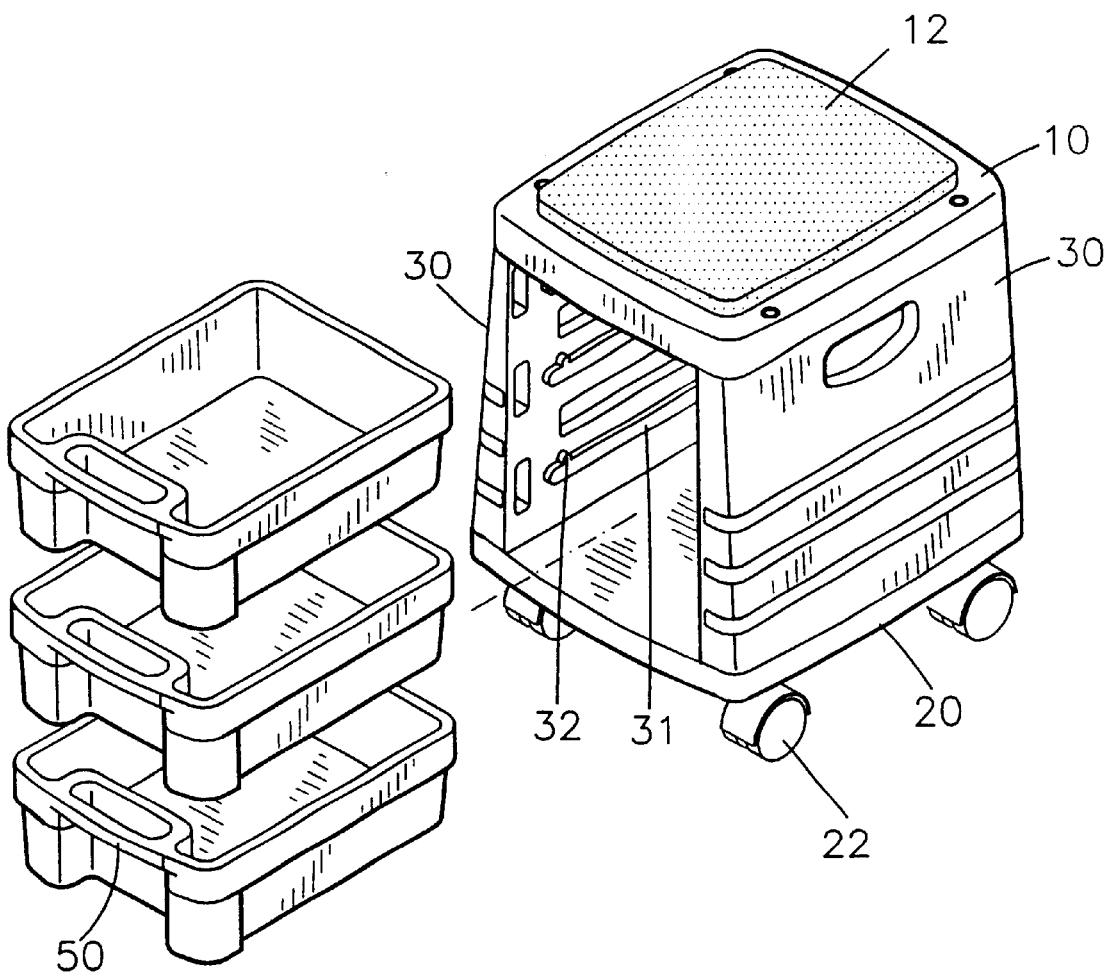
FIG. 5 is an exploded view to show the three drawers and the body of the present invention.
Figure 6:
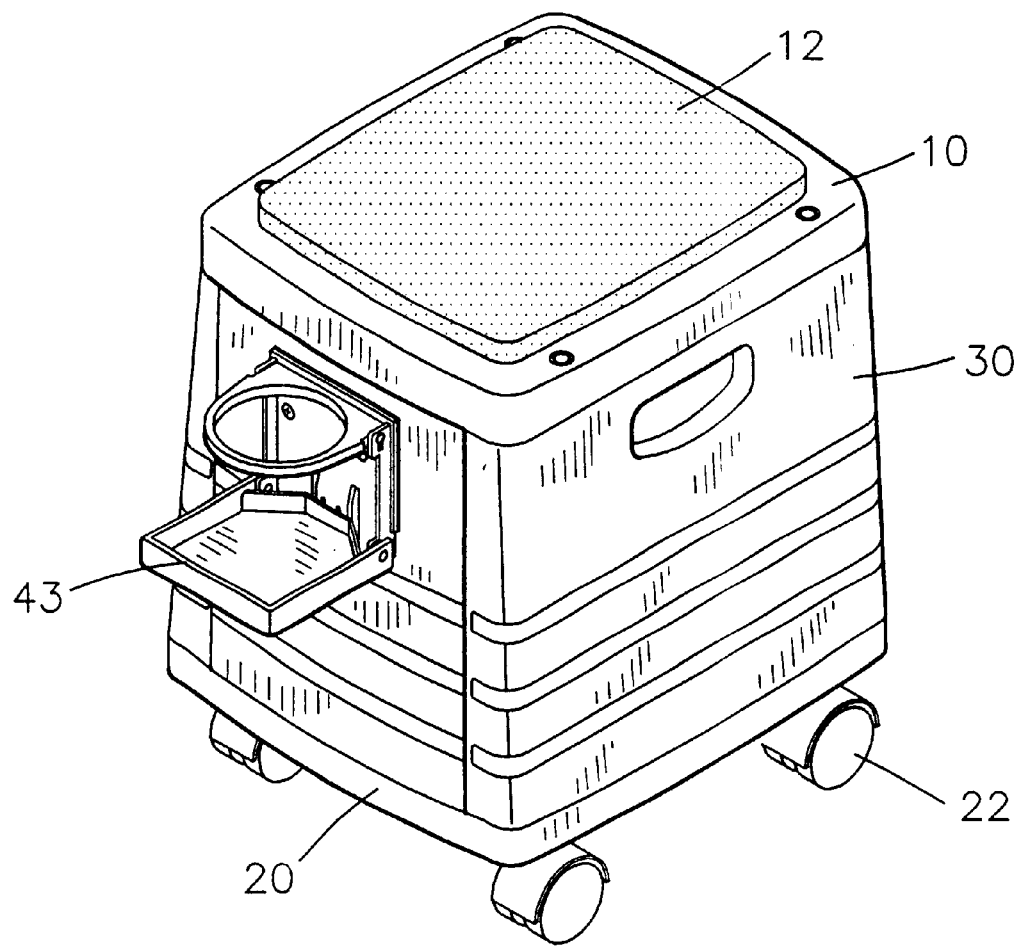
FIG. 6 is a perspective view to show the tool box of the present invention wherein the cup holder is opened.

Referring to FIGS. 2 and 6, a cup holder 43 is connected to an outside of the back board 40.

The tool box can be used as a bench so that a user may sit on the pad 12 and the cup holder 43 may hold a cup of drink. The tool box is easily moved by the wheels 22 and the user may grab the tool box by using the two recesses 35 in the two sidewalls 30.

While we have shown and described the embodiment in accordance with the present invention, it should be clear to those skilled in the art that further embodiments may be made without departing from the scope of the present invention.

What is claimed is:

1. A tool box comprising:

a base having three flanges on a top surface thereof;

two sidewalls each having a first groove defined in a bottom thereof and a second groove defined in an inside of each of the two sidewalls, a plurality of rails extending from the inside of each of the two sidewalls and each rail having a boss;

a back board having a third groove defined in a bottom thereof and two flanges extending from two sides of the back board, the three flanges of the base respectively engaged with the two first grooves of the sidewalls and the third groove of the back board, the two flanges of the back board respectively engaged with the two second grooves in the two sidewalls;

a top board fixedly connected on the two sidewalls and the back board, a pad connected on a top of the top board;

a plurality of drawers slidably supported on the rails; and a plurality of screws extending through the top board, the two sidewalls and engaged with the base.

2. The tool box as claimed in claim 1, wherein the base has two sets of wheels connected to a bottom thereof.

3. The tool box as claimed in claim 1, wherein each of the sidewalls has a recess defined in an outside thereof.

4. The tool box as claimed in claim 1 further comprising a cup holder connected to an outside of the back board.

* * * * *